US011868341B2

(12) United States Patent
George et al.

(10) Patent No.: US 11,868,341 B2
(45) Date of Patent: Jan. 9, 2024

(54) IDENTIFICATION OF CONTENT GAPS BASED ON RELATIVE USER-SELECTION RATES BETWEEN MULTIPLE DISCRETE CONTENT SOURCES

(71) Applicant: MICROSOFT TECHNOLOGY LICENSING, LLC, Redmond, WA (US)

(72) Inventors: Junia Anna George, Kirkland, WA (US); Chetan Bansal, Seattle, WA (US); Nikitha Rao, Bangalore (IN); Casey Jo Gossard, Spokane, WA (US); Dung Nguyen, Redmond, WA (US); David Boyd Ludwig, IV, Seattle, WA (US); Curtis Dean Anderson, Kent, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 83 days.

(21) Appl. No.: 17/122,954

(22) Filed: Dec. 15, 2020

(65) Prior Publication Data
US 2022/0121660 A1    Apr. 21, 2022

Related U.S. Application Data

(60) Provisional application No. 63/092,458, filed on Oct. 15, 2020.

(51) Int. Cl.
*G06F 16/242* (2019.01)
*G06F 16/14* (2019.01)
(Continued)

(52) U.S. Cl.
CPC ........ *G06F 16/2428* (2019.01); *G06F 16/156* (2019.01); *G06F 16/2425* (2019.01); *G06F 16/2457* (2019.01); *G06F 16/24553* (2019.01)

(58) Field of Classification Search
CPC ............ G06F 16/2428; G06F 16/2423; G06F 16/24553; G06F 16/156; G06F 16/2425; G06F 16/2457
See application file for complete search history.

(56) References Cited

U.S. PATENT DOCUMENTS 8,024,660 B1    9/2011    Quinn et al.
9,690,444 B1    6/2017    Joyce et al.
(Continued)

OTHER PUBLICATIONS

"International Search Report and Written Opinion Issued in PCT Application No. PCT/US2021/043103", dated Nov. 9, 2021, 10 Pages.
(Continued)

*Primary Examiner* — Vaishali Shah
(74) *Attorney, Agent, or Firm* — Newport IP, LLC; Jacob P. Rohwer

(57) ABSTRACT

Identification of content gaps based on relative user-selection rates between multiple discrete content sources. A system analyzes search log activity to determine whether users that are conducting particular types of search activities are ultimately selecting and relying upon content resources from a predefined content source of interest or, alternatively, whether such users are unsatisfied with the predefined content source of interest and are instead relying upon other third-party content sources. This particular type of analysis provides valuable insights into whether content gaps exist within the predefined content source of interest.

15 Claims, 9 Drawing Sheets

(51) Int. Cl.
*G06F 16/2455* (2019.01)
*G06F 16/2457* (2019.01)

(56) References Cited

U.S. PATENT DOCUMENTS

| | | | |
|---|---|---|---|
| 9,715,395 | B2 | 7/2017 | Kureshy et al. |
| 10,049,163 | B1* | 8/2018 | Sarmento ............ G06F 16/9535 |
| 10,558,688 | B1 | 2/2020 | Nguyen et al. |
| 10,585,927 | B1* | 3/2020 | Liao .................... G06F 16/338 |
| 2005/0197829 | A1* | 9/2005 | Okumura ............ G06F 40/268 |
| | | | 704/10 |
| 2005/0240576 | A1* | 10/2005 | Piscitello ............ G06F 16/248 |
| | | | 707/E17.069 |
| 2006/0277468 | A1 | 12/2006 | Sapir |
| 2009/0282010 | A1* | 11/2009 | Vasudevan ........... G06F 16/367 |
| 2011/0208715 | A1 | 8/2011 | Ni et al. |
| 2011/0307780 | A1* | 12/2011 | Harris .................. G06F 16/95 |
| | | | 715/708 |
| 2012/0110450 | A1* | 5/2012 | Kureshy ............ G06F 3/04895 |
| | | | 715/708 |
| 2012/0290575 | A1 | 11/2012 | Hu et al. |
| 2013/0111344 | A1 | 5/2013 | Sato et al. |
| 2014/0059042 | A1* | 2/2014 | Vinay .................. G06F 16/951 |
| | | | 707/723 |
| 2014/0120513 | A1* | 5/2014 | Jenkins ................ G06F 40/237 |
| | | | 434/362 |
| 2015/0039622 | A1* | 2/2015 | Sampath-Kumar ......................... |
| | | | G06F 16/958 |
| | | | 707/740 |
| 2015/0278355 | A1* | 10/2015 | Hassanpour .......... G06F 16/951 |
| | | | 707/706 |
| 2018/0032890 | A1 | 2/2018 | Podgorny et al. |
| 2018/0335900 | A1 | 11/2018 | Ramalingam et al. |
| 2020/0242714 | A1* | 7/2020 | Doti .................... H04L 67/306 |

OTHER PUBLICATIONS

Lee, Younghoon, "Data Driven Approaches in User Experience Analysis: Customer-voice classification, User segmentation and Design elements selection", In Doctoral Dissertation, 2019, 148 Pages.

* cited by examiner

IDENTIFICATION OF CONTENT GAPS BASED ON RELATIVE USER-SELECTION RATES BETWEEN MULTIPLE DISCRETE CONTENT SOURCES

PRIORITY APPLICATION

This application claims the benefit of and priority to U.S. Provisional Application No. 63/092,458, filed Oct. 15, 2020, entitled "Identification of Content Gaps Based on Relative User-Selection Rates Between Multiple Discrete Content Sources," the entire contents of which are incorporated herein by reference.

BACKGROUND

Businesses strive to continually improve upon certain content sources that are made available to consumers for the purpose of learning about specific topics such as products and/or services. As a specific example, a business that offers a computer software program that includes a native (e.g., built-in) help function that is linked to a specific source of help content may strive to continuously improve the quality and/or breadth of the help content included within the specific source. One challenge associated with effectively managing content creation efforts is identifying ripe opportunities for creating new content to cover topics that have become temporally relevant to a user-base (e.g., users interested in a specific topic). Another challenge associated with effectively managing content creation efforts is identifying ripe opportunities for improving upon existing content that is deficient in relation to third-party content sources that are being selected by the user-base instead of the existing content.

Unfortunately, analyzing the manner in which a user-base interacts with merely a single content source reveals little with respect to ripe opportunities for improving upon that single content source. This is because merely determining that a user has accessed a resource (e.g., webpage) from this single content source while searching for information related to a specific topic fails to provide a reliable indication as to whether the accessed content resource actually satisfied the user's search needs or whether the user ultimately turned to other third-party content sources. Even worse, observing merely user interactions with the single content source will reveal no information whatsoever in the event that a user turns directly to a web-based search engine to conduct the search and exclusively accesses third-party content.

It is with respect to these considerations and others that the disclosure made herein is presented.

SUMMARY

Technologies described herein facilitate identification of content gaps based on relative user-selection rates between multiple discrete content sources. Generally described, a system analyzes search log activity to determine whether users that are conducting particular types of search activities are ultimately selecting and relying upon content resources from a predefined content source of interest or, alternatively, whether such users are unsatisfied with the predefined content source of interest and are instead relying upon other third-party content sources. This particular type of analysis provides valuable insights into whether content gaps exist within the predefined content source of interest. To illustrate this point, suppose that a user-base enters numerous search queries that reveal the specific intent of seeking support content that is specifically related to a particular functionality of a product that is offered by a business. Under these circumstances, a pattern of the user-base choosing support content that is created by some third-party (e.g., some entity other than the business) over the support content that is created by the business serves as a strong indication of a content gap within the business' own support content. Ultimately, once the above described analysis reveals the indication of the content gap, the business gains valuable insight regarding where to direct content creation efforts so as to maximize the value added as the business strives to continually improving the quality and breadth of a specific content source.

Stated plainly, a content gap generally refers to instances in which a predefined content source of interest (e.g., a business' own organically generated support or help content) lacks certain areas of content altogether or in which content for a certain area is subpar such that a user-base demonstrates a preference towards other content sources to obtain information on this certain area. For example, a certain area of content may correspond to support or help content that is designed to inform users how to deploy some specific functionality of a specific application (e.g., a conference call functionality of a telecommunications software application).

In an exemplary implementation, a system obtains search query log data that defines uniquely identified resources that have been returned in response to certain user-generated queries. A prime source of such search query log data is web search engines because computer users are increasingly relying upon the internet to obtain information related to topics of interest. Furthermore, since the search query log data produced by web search engines includes both of: (i) highly specific user-generated search queries from which topics of interest and intents can often be gleaned and further includes user interaction data that logs the users' behaviors, (ii) and interactions (e.g., click-rates, dwell times, etc.) with multiple discrete content resources, this type of search query log data can reveal much about how a specific content source stacks up against other content sources that third-party competitors have created with respect to the topics of interest and intents gleaned from the user-generated search queries. For illustrative purposes, suppose that search query log data obtained from a web search engine defines both of a highly specific search string entered by a particular user (e.g., "how to add multiple people to a call in Skype") in addition to user interaction data that defines with a high degree of specificity how that particular user interacted with the uniquely identified resources that were returned in response to the entered search string.

Upon obtaining the search query log data described above, the system may parse through and analyze characteristics of an enormous number of user-generated queries, that are submitted to a web search engine during some relevant period of time, to identify a product-related subset of the user-generated queries. For example, under circumstances in which the techniques described herein are being deployed to identify content gaps in support content that a business has created for a specific product, the system may identify user-generated search queries which include the name of the specific product. Additionally, or alternatively, the system may identify user-generated searches that were entered and from which the results ultimately returned to and/or selected by the user include the name of the specific product. These two examples are for illustrative purposes only and the system may identify any other suitable product characteristics that are indicative of an individual user-generated query being generated in relation to the product of interest. Referring again to the highly specific user-defined search string of "how to add multiple people to a call in Skype," in some implementations the characteristic of the product name "Skype" being included in the user-generated query may be sufficient for this particular user-generated query to be included within the product-related subset identified.

In this exemplary implementation, the system may further analyze those user-generated queries that have been included within the product-related subset to identify an intent-specific subset. The intent-specific subset includes, and is limited to, individual user-generated queries that have been entered for some specific intent or purpose. For example, the system may analyze the individual user-generated queries within the product-related subset on an individual basis to identify queries that match some query-intent parameters of a query-intent taxonomy. As used herein, the term "query-intent taxonomy" refers to a scheme for classifying user-generated queries into one or more intent-classifications associated with a specific intent or purpose for which the user-generated queries have been entered. As a specific example, a query-intent taxonomy may define query-intent parameters for classifying individual queries as having an underlying user intent of obtaining support for a product of interest, obtaining data that compares two or more products, completing a purchase of a product, and so on. Exemplary query-intent parameters that indicate a user-intent of obtaining support content for a product of interest may be a search string including specific terms such as, for example, "how to," "support," "help," "care," "repair," "problem," and/or "troubleshoot." Referring again to the highly specific user-defined search string of "how to add multiple people to a call in Skype," in some implementations the characteristic of the query string fragment of "how to" being included in the user-generated query may be sufficient for this particular user-generated query to be included within the intent-specific subset associated with obtaining support content for a product of interest.

In the exemplary implementation, initially identifying the product-related subset that includes queries which are specifically related to a product of interest and then further parsing this product-related subset into the intent-specific subset serves as an effective process for identifying queries that a typical business that offers the product of interest would strive to develop relevant content for. For example, a software company that offers a specific software application and also strives to provide high quality support content for this specific software application may be quite interested in gleaning insights from the web browsing behavior (e.g., click-rates, dwell times, etc.) that stems from queries that are seeking support content in relation to the specific software application. In this way, instances in which users rely on third-party support content to resolve issues with the specific software application rather than relying on the support content provided by the business itself can potentially inform the business of content gaps within its own support content.

In some implementations, the system may be configured to parse the queries in the product-related subset and/or the intent-specific subset into a plurality of query string fragments. In this way, the system may identify high volume phrases that are associated with the product of interest and/or reveal a particular user intent such as obtaining support content for the product of interest. For example, a determination that the phrase "add multiple people" is included within a high volume of queries that are submitted for the purpose of obtaining support content in association with the specific software application may serve as a strong indication that a user-base is experiencing difficulties with a conference call functionality of the specific software application. In some embodiments, the system may also determine occurrence levels associated with the individual query string fragments. That is, the system may determine how many times specific query string fragments are included within the user-generated queries in the product-related subset and/or the intent-specific subset. As described below, the relative occurrence levels may be useful in gleaning insights that relate to prioritizing where a business' limited resources can be most efficiently deployed for content creation and/or content enhancement efforts. For example, if a particular query string fragment associated with a first application feature has an occurrence level that is significantly higher than some other query string fragment associated with a second application feature, then the business may decide to prioritize addressing content gap issues associated with the first application feature over other seemingly less pressing content gaps associated with the second application feature.

In order to identify content gaps within some specific content source of interest, the system may analyze the search query log data to determine certain relevant web-browsing behaviors that occur in relation to multiple discrete content sources from which search results of returned. As a specific example, the system may determine user-selection rates corresponding to uniquely identified resources that are returned in association with relevant user-generated queries as a whole or, more granularly, particular query string fragments that have been parsed from the relevant user-generated queries (i.e., the relevant queries being those included within the product-related subset and/or the intent-specific subset). In some embodiments, identification of the content gaps may be based on some other factors such as dwell time associated with particular uniquely identified resources (e.g., an amount of time that a user spends on a webpage). In this respect, it can be appreciated that if a user submits a query with the intent of obtaining support content for the product of interest and then clicks on a particular uniquely identified resource that is returned but then goes back to the results after a short period of time, then this behavior may serve as an indication that the particular uniquely identified resource represents a content gap in the sense that it is deficient (e.g., it did not satisfy the user's needs).

Ultimately, the system may generate a dashboard graphical user interface (GUI) that communicates various insights obtained from analyzing the search query log data. For example, the dashboard GUI may graphically indicate unique correspondence between the individual user-selection rates and the individual uniquely identified resources that are returned in association with individual query string fragments that are parsed from the individual user-generated queries.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description describes techniques for automatically identifying content gaps within a specified content source based on relative user-selection rates between the specified content source and multiple other content sources that are discrete from the specified content source. Generally described, a system analyzes search log activity to determine whether users that are conducting searches for a specific content area are ultimately selecting and relying upon content resources from the specified content source or, alternatively, whether such users are instead relying upon other discrete (e.g., third-party) content sources. This analysis provides valuable insights into whether content gaps exist within the specified content source. To illustrate this point, suppose that a user-base enters numerous search queries that frequently reveal a common user-intent of seeking support content that is specifically related to a particular functionality of a business' software product. Under these circumstances, a pattern of the user-base choosing support content that is created by some third-party (e.g., some entity other than the business) over the support content that is created by the business serves as a strong indication of a content gap within the business' own support content.

For purposes of the present disclosure, content gap generally refers to instances in which a predefined content source of interest (e.g., a business' own organically generated support or help content) lacks certain areas of content altogether or in which content for a certain area is wanting such that a user-base demonstrates a preference towards other content sources to obtain information on this certain area. For example, a certain area of content may correspond to support or help content that is designed to inform users how to deploy some specific functionality of a specific application (e.g., a conference call functionality of a telecommunications software application). Ultimately, once the above described analysis reveals the indication of the content gap, the business gains valuable insight regarding where to direct content creation efforts so as to maximize the value added as the business strives to continually improving the quality and breadth of a specific content source.

Figure 1:
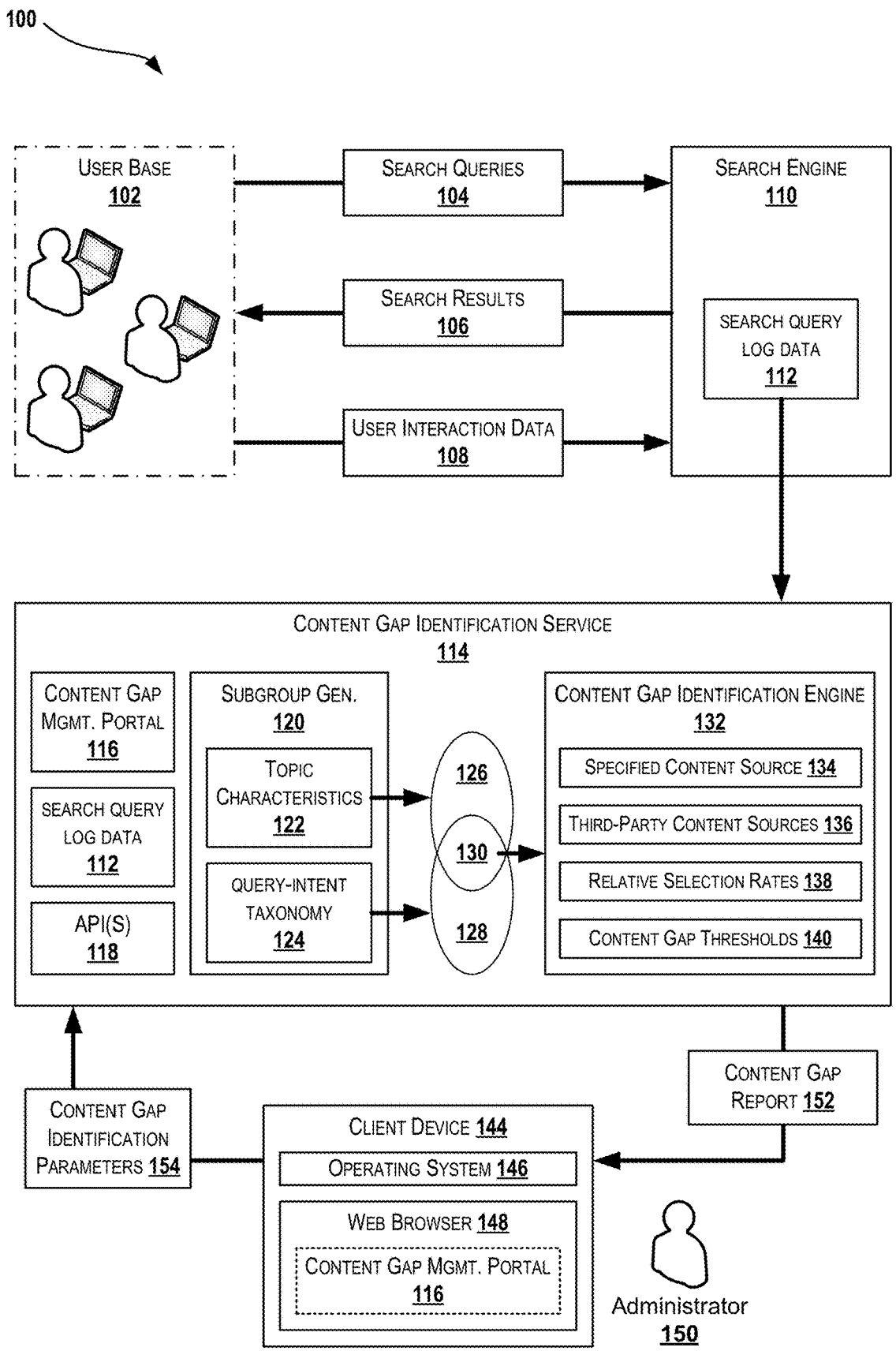
FIG. 1 illustrates an example data flow scenario with respect to a system that deploys a content gap identification service to identify content gaps based on relative user-selection rates between a specified content source and one or more third-party content sources.

Turning now to FIG. 1, an exemplary implementation of the disclosed techniques is illustrated with respect to a system 100 that deploys a content gap identification service 114 to identify content gaps based on relative selection rates 138 (also referred to herein as "user-selection rates") between a specified content source 134 and one or more third-party content sources 136. The content gap identification service 114 may be configured to expose a content gap management portal 116 to enable an administrator 150 to define various content gap identification parameters 154 that are usable for identifying a relevant subset 130 of search queries 104 and/or for analyzing user interaction data 108 associated with this relevant subset 130 to identify content gaps within the specified content source 134 (e.g., as compared to the third-party content sources 136). For example, the administrator 150 may log into the content gap management portal 116 via a client device 144. Additionally, the content gap management portal 116 may be configured to communicate aspects of a content gap report 152 to the administrator 150 via the client device 144. In the illustrated embodiment, the content gap identification service 114 executes computer executable code that is designed to facilitate aspects and/or functionalities of the content gap management portal 116. Here, the content gap identification service 114 provides the administrator 150 with access to the content gap management portal 116 through a web browser 148 that is being executed by an operating system 146 on the client device 144 (e.g., a laptop computer, a smart phone, etc.). In other implementations, access to the content gap management portal 116 may be provided by other means.

The content gap identification service 114 stores or otherwise has access to search query log data 112 that is generated by a search engine 110 with which a user base 102 interacts with to obtain information on specific topics. The user base 102 is comprised of a plurality of users that utilize client devices such as, for example, laptops and/or smartphones to submit search queries 104 to the search engine 110. An exemplary search query 104 may include a highly specific user-generated search string that is designed to provide enough relevant information to the search engine 110 regarding what type of information is being sought so that the search engine 110 can identify and return relevant search results 106. For example, a user-generated search string of "how to add multiple people to a call in Skype" may provide the search engine 110 with sufficient information for the search engine 110 to determine that the user is searching for help content in relation to a specific functionality for a specific product of interest (e.g., Skype).

As illustrated in FIG. 1, the search engine 110 returns search results 106 to the user base 102 in response to the search queries 104. In some embodiments, the search results 106 may include a ranked list of uniquely identified resources such as, for example, webpages that are determined by application of a search algorithm to be relevant to the search queries 104. Detailed user interaction data 108 is generated based on specifically how individual users of the user base 102 interact with the search results 106. Exemplary user interaction data 108 may include, but is not limited to, user-selection rates associated with individual ones of the search results 106 and/or dwell times associated with individual ones of the search results 106. It can be appreciated that these types of user interaction data 108 may be useful tools for gleaning the user-perceived value of individual search results 106 in relation to individual search queries 104. For example, if a user enters a particular search query 104 and then initially selects a first search result but quickly hits back (e.g., resulting in the dwell time of this first search result is low/under a threshold amount of time) and then selects a second search result and stays on that second search result (presumably to consume/read through the provided content), then this may serve as a strong indication that this user perceived the second search result to be of greater relevance with respect to the particular search query 104 than the first search result.

It can be appreciated that search engines such as, for example, Microsoft Bing® and Google® may serve as a valuable source of search query log data 112 because savvy computer users that are seeking information related to certain topics or products of interests are increasingly relying on internet-based search engines for their information gathering needs. Furthermore, since the search query log data 112 produced by search engines 110 includes both of highly specific user-generated search queries 104 from which topics of interest and intents can often be gleaned and further includes user interaction data 108 that logs the users' behaviors and interactions (e.g., click-rates, dwell times, etc.) with multiple discrete content resources, this type of search query log data 112 can reveal much about how a specified content source 134 stacks up against other "third-party" content sources 136 that third-party competitors have created.

As illustrated, the search query log data 112 is provided to the content gap identification service 114 from the search engine 110. As further illustrated, the content gap identification parameters 154 may be generated by way of the content gap management portal 116 and then provided to the content gap identification service 114 from the client device 144. The content gap identification parameters 154 may include, but are not limited to, topic characteristics 122 that are usable to identify a topic-related subset 126 of the search queries 104, a query-intent taxonomy 124 that is usable to identify an intent-specific subset 128 of the search queries 104, and an indication of a specified content source 134. In general, the specified content source 134 corresponds to a user-defined content source that the administrator 150 is interested in configuring the content gap identification service 114 to automatically identify content gaps within as compared to third-party content sources 136. In this way, a content gap report 152 may ultimately be generated so as to help business personnel quickly and reliably identify opportunities for creating new content that has become temporally relevant to the user-base 102 and/or for improving upon existing content of the particular content source which the user-base 102 ostensibly perceives as inferior or wanting as compared to other third-party content sources 136.

In some embodiments, one or more of the third-party content sources 136 may be specifically identified or flagged by the administrator 150. For example, under circumstances in which a business has a known fierce competitor in the realm of content creation, the administrator 150 may specifically identify a third-party content source 136 of this competitor to solicit notifications when content gaps are identified based on one or more relative selection rates 138 between the specified content source 134 and this specifically identified third-party content source 136. Additionally, or alternatively, the third-party content sources 136 may simply correspond to any content sources that are separate and discrete from the specified content source 134.

Upon obtaining the search query log data 112 and content gap identification parameters 154 as described above, the content gap identification service 114 deploys a subgroup generator 120 to analyze the search query log data 112 to identify the relevant subset 130 of the search queries 104. In some implementations, the subgroup generator 120 may initially identify the topic-related subset 126 based on the topic-characteristics 122, or vice versa. For example, the subgroup generator 120 may identify search queries 104 that include an indication of some topic of interest within the search string. Additionally, or alternatively, the content gap identification service 114 may identify search queries 104 from which the search results 106 ultimately returned to and/or selected by the user include an indication of the topic of interest.

For illustrative purposes, presume that the topic of interest is a software application for which the specified content source 134 is support or help content. Further presume that the administrator 150 enters the content gap identification parameters 154 on behalf of a business that strives to continually improve upon the specified content source 134 and, therefore, is seeking opportunities to create new help content to cover topic areas that have become relevant to the user-base 102 and/or to improve upon existing topic areas within the specified content source 134. Under these exemplary circumstances, the topic characteristics 122 may include a tradename associated with the software application. Thus, the identifying the topic-related subset 126 may include identifying individual ones of the search queries 104 that include this tradename within a user-generated search string. To illustrate this point, it can be readily appreciated that if the topic characteristics 122 include the tradename of "Skype," then the topic-related subset 126 that is generated by the subgroup generator 120 may include (and potentially be limited to) those user-generated search queries 104 having a text-based or natural language search string which includes "Skype."

Furthermore, upon obtaining the search query log data 112 and content gap identification parameters 154, the content gap identification service 114 may also deploy the subgroup generator 120 to identify the intent-specific subset 128 (of the search queries 104) by analyzing the search query log data 112 based on the query-intent taxonomy 124. The intent-specific subset 128 includes, and is limited to, individual "user-generated" search queries 104 that have been entered for some specific intent or purpose. For example, the content gap identification service 114 may analyze the individual search queries 104 within the product-related subset 126 on an individual basis to identify those search queries 104 that match some query-intent parameters of the query-intent taxonomy 124.

As illustrated, a relevant subset 130 of the search queries 104 corresponds to those which are included in both of the topic-related subset 126 and the intent-specific subset 128. Thus, in some embodiments, the content gap identification service 114 may initially determine the topic-related subset 126 based on the topic characteristics 122 and then may identify the relevant subset 130 by performing a subsequent analysis that is limited to search queries 104 that have been identified for inclusion within the topic-related subset 126. That it, since it is known from the onset of the analysis that inclusion within the relevant subset 130 requires that a query 104 be included within the product-related subset 126, the subgroup generator 120 may converse computing resources (e.g., processing cycles, memory usage, etc.) by refraining from analyzing search queries 104 that fall outside of the topic-related subset 126.

The query-intent taxonomy 124 defines criteria for classifying the user-generated queries into one or more intent-classifications associated with a specific intent or purpose for which the user-generated search queries 104 have been entered. As a specific example, the query-intent taxonomy 124 may define query-intent parameters for classifying individual search queries 104 as having an underlying purpose or user-intent of obtaining support content that specifically relates to a product of interest. Additionally, or alternatively, the query-intent taxonomy 124 may define query-intent parameters for classifying individual search queries 104 as having an underlying user-intent of obtaining data that compares two or more products, and/or completing a purchase of a product, and so on. Exemplary query-intent parameters that indicate a user-intent of obtaining support content for a product of interest may be a search string including specific terms such as, for example, "how to," "support," "help," "care," "repair," "problem," and/or "troubleshoot." Referring again to the highly specific user-defined search string of "how to add multiple people to a call in Skype," the characteristic of the query string fragment of "how to" being included in the user-generated search query 104 may be sufficient for this particular user-generated search query 104 to be included within the intent-specific subset 128 associated with obtaining support content for a product of interest.

With respect to product-related searches specifically, users can have a variety of different user-intents or underlying purposes for formulating and submitting such searches in relation to products of interest. For example, a user might be searching for information to compare a product of interest to other similar or competing items. A user might desire to purchase the product of interest and, thus, may be searching for pricing and/or availability information. Furthermore, a user who is having certain difficulties while utilizing a product of interest may conduct a product-related search for the specific purpose of identifying support content (also referred to herein as "help content") related to the product of interest. For example, a user that is attempting to use a telecommunications application to conduct a conduct call that includes five different people may be able to call a single user and then become frustrated for not understanding how to add the other four users to the call. In order to find support content that explains how to do so, the user may search on a native in-app support functionality that is built into the telecommunications application. Then, in the event that the user is unable to obtain satisfactory help content via the native support functionality, the user may then turn to an internet-based search engine to obtain the desired information. Accordingly, the individual search strings that are formulated by this user will likely reveal information that identifies one or more of: the product of interest, the underlying intent of obtaining support content (i.e., in association with this product of interest), and often times even the specific functionality of the product which the user is having troubles with. Furthermore, business typically provide and strive to continuously improve upon support content that is specifically related to their product offerings. Accordingly, the detailed nature of searches that are both product-related and formulated for the purpose of obtaining support content along with the fact that businesses often strive to provide the most robust support content available for their own products results in the techniques described herein being particularly well suited for identifying content gaps within help or support content. For this reason, the techniques described herein are predominantly described in relation to product-related searches for help content. However, the scope of the techniques herein is not limited in applicability to this specific scenario.

Initially identifying the topic-related subset 126 that includes search queries 104 which are specifically related to a topic of interest (e.g., a software product) and then further parsing this topic-related subset 126 into the intent-specific subset 128 serves as an effective process for identifying search queries 104 that a typical business that offers a product of interest would strive to develop relevant content for. For example, a software company that offers a specific software application and also strives to provide high quality support content for this specific software application may be quite interested in gleaning insights from the web browsing behavior (e.g., click-rates, dwell times, etc.) that stems from search queries 104 that are seeking support content in relation to the specific software application. In this way, instances in which users rely on the third-party support content sources 136 to resolve issues with the specific software application rather than relying on the support content provided by the business itself (e.g., the specified content source 134) can potentially inform the business of content gaps within its own support content.

As illustrated, the content gap identification service 114 may generate a content gap report 152 to inform the administrator 150 (or some other business personnel) of circumstances in which the relative selection rates 138 meet or exceed some predefined content gap thresholds 140. For example, the content gap thresholds 140 may be defined so that the content gap report 152 is generated and transmitted to the client device 144 in response to search queries 104 within the relevant subset 130 resulting in higher selection rates in association with a particular third-party content source 136 as compared to the specified content source 134. As a specific but non-limiting example, suppose that during some relevant time period one-thousand search queries 104 were submitted by the user-base 102 which were substantially similar to the specific search string of "how to add multiple people to a call in Skype." Further suppose that the relevant subset of queries resulted in a mere fifty users selecting remaining on a webpage from the specified content source 134 (e.g., answers.contoso.com) for some threshold amount of time (e.g., a predefined dwell time) whereas the relevant subset of queries also resulted in eight hundred other users selecting and remaining on a competing webpage on a third-party content source (e.g., www.getsoftwarehelp-frombob.com). Here, the circumstances of the users turning to the competing webpage at an astounding ratio of sixteen-to-one may trigger generation of the content gap report 152. Upon receipt of the content gap report 152, the administrator 150 may quickly ascertain a specific content area of the specified content source for which an improvement in content is warranted (e.g., content that explains how to add multiple users to a Skype teleconference call).

Figure 2:
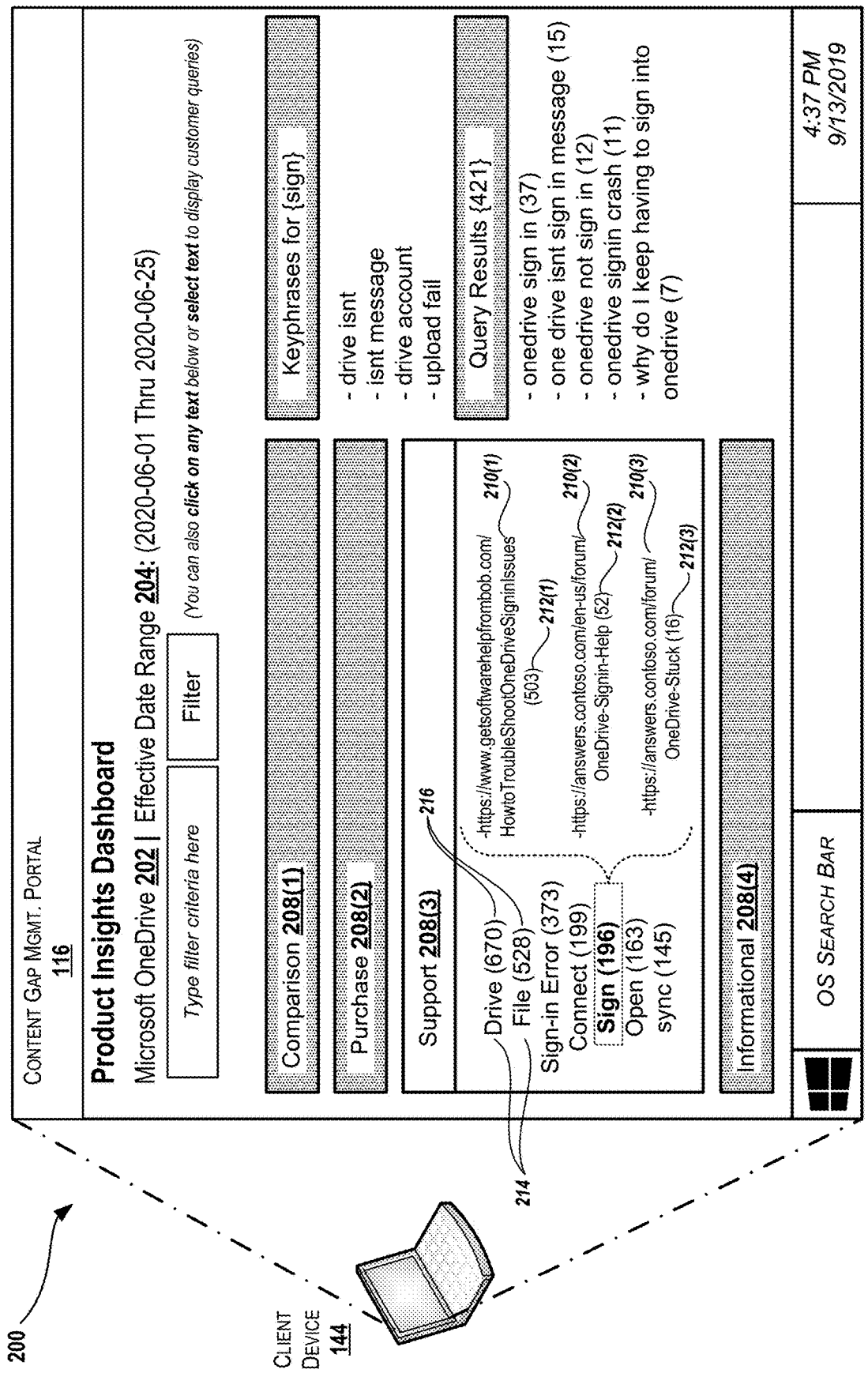
FIG. 2 illustrates an exemplary dashboard graphical user interface (GUI) that graphically indicates unique correspondence between individual user-selection rates and individual uniquely identified resources that are returned in response to a relevant set of queries.

Turning now to FIG. 2, illustrated is an exemplary dashboard graphical user interface (GUI) 200 that graphically indicates unique correspondence between individual user-selection rates 212 and individual uniquely identified resources 210 that are returned in response to a relevant set of queries. As illustrated, the dashboard GUI 200 is showing a first uniquely identified resource 210(1) that has a first user-selection rate 212(1) of five-hundred and three (503), a second uniquely identified resource 210(2) that has a second user-selection rate 212(2) of fifty-two (52), and a third uniquely identified resource 210(3) that has a third user-selection rate 212(3) of sixteen (16).

As illustrated, the dashboard GUI 200 may be in the form of a Topic and/or Product Insights Dashboard that is configured to provide timely and relevant insights into what content sources are being relied upon by a user-base when searching for various types of information in relation to a topic and/or product of interest 202 (e.g., "Microsoft OneDrive" in the specifically illustrated but nonlimiting example). The dashboard GUI 200 may enable an administrator 150 to prescribe an effective date range 204 to obtain and/or analyze the search query log data 112 for. For example, as illustrated, the information displayed via the dashboard GUI 200 is derived from search query log data 112 that is limited to the date range of Jun. 1, 2020 through Jun. 25, 2020.

With respect to parsing the search queries 104 based on an underlying user-intent or purpose, the content gap identification service 114 may analyze the user-generated queries 104 on an individual basis to identify those search queries 104 that match some query-intent parameters of a query-intent taxonomy. Exemplary query-intent parameters that indicate a user-intent of obtaining support content for a product of interest may be a search string including specific terms such as, for example, "how to," "support," "help," "care," "repair," "problem," and/or "troubleshoot." Referring again to the exemplary user-defined search string of "how to add multiple people to a call in Skype," in some implementations the query string fragment of "how to" being included in the user-generated query may be sufficient for this particular user-generated query to be included within the intent-specific subset associated with obtaining support content for a product of interest. Exemplary query-intent parameters that indicate a user-intent of comparing two or more products of interest may be a search string including specific terms such as, for example, "vs," "versus," "comparison," and/or "difference." For example, a user-generated query of "Microsoft OneDrive versus Contoso SecureDrive" may aptly be classified in a "Comparison" intent-specific subset. Exemplary query-intent parameters that indicate a user-intent of buying a product of interest may be a search string including specific terms such as, for example, "buy," "download," "install," and/or "purchase."

In some embodiments, the dashboard GUI 200 includes one or more query-intent user interface elements (UIEs) 208 that are selectable to access information and/or insight data that is generated in relation to search queries 104 that reveal a particular user-intent or underlying purpose. For example, as illustrated, the dashboard GUI 200 includes a first query-intent UIE 208(1) that is selectable to access insight data that is generated in relation to a "Comparison" user-intent (e.g., a user entering a search query to compare two products of interest), a second query-intent UIE 208(2) that is selectable to access insight data that is generated in relation to a "Purchase" user-intent (e.g., a user entering a search in an effort to purchase a product of interest), a third query-intent UIE 208(3) that is selectable to access insight data that is generated in relation to a "Support" user-intent (e.g., a user entering a search query to find support content for a product of interest), and a fourth query-intent UIE 208(4) that is selectable to access insight data that is generated in relation to an "Informational" user-intent (e.g., a user entering a search query in order to generally learn about a topic or product of interest). In FIG. 2, the third query-intent UIE 208(3) has been selected to access insight data that is generated in relation to the "Support" user-intent. Accordingly, the dashboard GUI 200 is shown to be displaying information associated with observed user-interaction data 108 that has occurred in relation to users of the user-base 102 entering search queries 104 for the specific underlying purpose of finding support content for a product of interest (e.g., Microsoft OneDrive in the illustrated example).

For purposes of the present discussion of FIG. 2, presume that the content gap identification parameters 154 described in relation to FIG. 1 identify the domain of "answers.contoso.com" as the specified content source 134. Thus, by virtue of being outside of (e.g., external to) this specified domain, the website "www.getsoftwarehelpfrombob.com" is a third-party content source 136. As described above, circumstances in which a user-base 102 relies predominantly on third-party content over the specified content source 134 when searching for a specific type of information in relation to a specific product may be indicative of this specified content source 134 having a content gap in relation to the third-party content. With respect to this point, the first user-selection rate 212(1) for the third-party content being higher than each of the second user-selection rate 212(2) and third user-selection rate 212(3), that correspond to uniquely identified resources included within the specified content source 134, indicates that the specified content source 134 is potentially deficient compared to the first uniquely identified resource 210(1). Thus, based on the information being displayed within the dashboard GUI 200, a business can analyze various aspects of the relevant set 130 of search queries 104 to ascertain what type of issue the user-base 102 was experiencing that spurred the reliance on the third-party content source (i.e., the website "www.getsoftwarehelpfrombob.com"). Ultimately, the business can then enhance its own content within the specified content source 134 to better meet the needs of the user-base 102.

In some implementations, the content gap identification service 114 is configured to parse the search queries 104 in the relevant subset 130 into a plurality of query string fragments 214 based on certain factors such as, for example, the frequency with which the query string fragments 214 occur within the relative subset 130. For example, the query string fragments may be identified as high volume phrases (e.g., individual words or strings of two or more words) that are associated with the product of interest and/or reveal a particular user intent such as obtaining support content for the product of interest. Additionally, or alternatively, the query string fragments may be identified as trending phrases (e.g., phrases for which a frequency of occurrence within the relevant subset 130 has increased by a threshold amount during the effective date range). It can be appreciated that identification of query string fragments that represent trending phrases may be particularly useful in identifying content gaps associated with newly developed difficulties faced by a user-base while using a product of interest. For example, under circumstances in which a recently released update that is installed across the user-base results in a software glitch or other unexpected troubleshooting issue, the user-base may begin to enter search queries in an effort to gain help at resolving the issue. Here, the techniques described herein may identify newly trending query string fragments and promptly inform appropriate business personnel by generating a content gap notification. In this way, the business personnel are able to quickly identify an opportunity to develop new support content that is directly designed to assist the user-base in resolving the newly developed troubleshooting issue.

In some embodiments, the content gap identification service 114 may also determine occurrence levels associated with the individual query string fragments. That is, the content gap identification service 114 may determine how many times specific query string fragments are included within the user-generated search queries 104 in the relevant subset 130. For example, as illustrated, the dashboard GUI 200 shows a plurality of query string fragments 214 and the corresponding frequencies (216) with which those query string fragments have occurred with the relative subset 130 of search queries 104. As specifically illustrated, within the effective data range 204 of Jun. 1, 2020 through Jun. 25, 2020: the query string fragment of "Drive" was included within six-hundred and seventy individual search queries 104 of the relevant subset 130; the query string fragment of "File" was included within five-hundred and twenty-eight individual search queries 104 of the relevant subset 130, and so on.

In some embodiments, each of the graphical representations of the query string fragments 214 serve as an individual UIE that is selectable to cause the dashboard GUI 200 to display the uniquely identified resources 210 (along with their corresponding user-selection rates 212) that were returned and most selected in response to search queries which included that query string fragment 214. For example, as illustrated, the individual UIE that reads "Sign" has been selected by a user (e.g., an indicated by the bold emphasis of this particular query string fragment). Thus, as a result of this "Sign" UIE being selected, the dashboard GUI 200 is updated to display the uniquely identified resources 210 which attracted the highest user-selection rates 212 in association with the query sting fragment of "Sign."

It will be appreciated that various types of information shown and/or described in relation to the dashboard GUI 200 may provide a business with insights associated with prioritizing where the business' limited resources can be most efficiently deployed for content creation and/or content enhancement efforts. For example, if a particular query string fragment associated with a first application feature (e.g., a conference call functionality) has an occurrence level that is significantly higher than some other query string fragment associated with a second application feature (e.g., a record meeting functionality), then the business may decide to prioritize addressing content gap issues associated with the first application feature over other seemingly less pressing content gaps associated with the second application feature. For example, the relative occurrence levels associated with these functionalities may inform business personnel that the user base 102 is having immense difficulties with the conference call functionality but in contrast is utilizing the record meeting functionality with relative ease.

Figure 3:
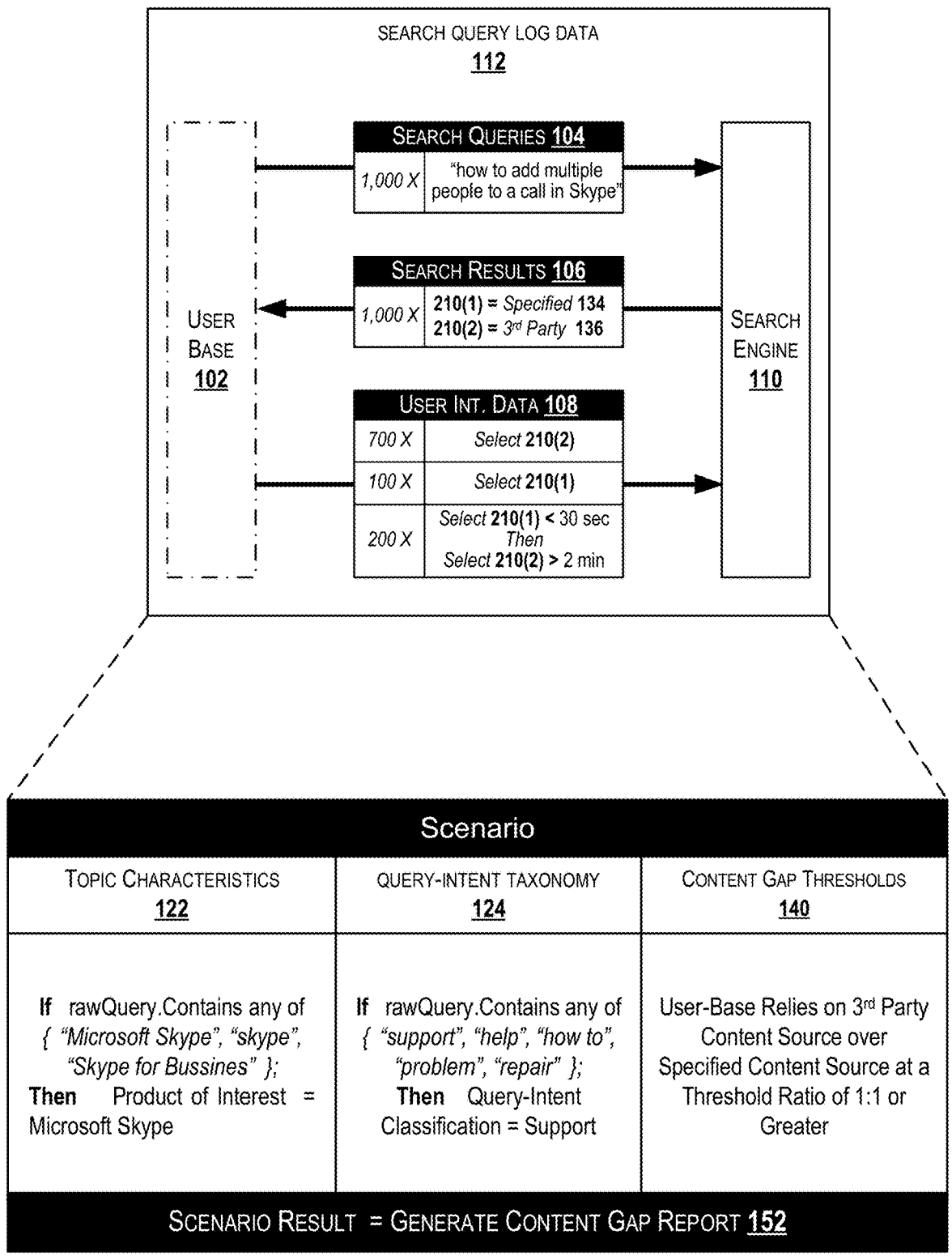
FIG. 3 illustrates a scenario in which a content gap report is generated in response to a determination that a user-base is relying upon third-party content over a specified content source by at least some threshold ratio.

FIG. 3 illustrates a scenario in which a content gap report 152 is generated in response to a determination that a user-base is relying upon third-party content over a specified content source by at least some threshold ratio. The threshold ratio may be defined within the content gap thresholds 140 described in relation to FIG. 1. For purposes of the illustrated scenario, the threshold ratio is defined as one-to-one ("1:1") so that circumstances in which a user-base is relying upon third-party content sources at the same rate as or even slightly more than the specified content source will satisfy the content gap threshold 140 and result in a content gap report being generated (e.g., to inform the administrator 150 of a potential content gap or deficiency of the specified content source).

The illustrated scenario corresponds to topic characteristics 122 being defined to identify a product-related subset of queries that specifically relate to a particular product (e.g., Microsoft Skype). For example, as illustrated, the topic characteristics 122 define an objective parameter that an individual search query 104 including one or more predefined text-strings will result in that individual search query 104 being included within the product-related subset 126.

The illustrated scenario further corresponds to a query-intent taxonomy 124 being defined to identify individual search queries 104 for inclusion within an intent-specific subset 128 that corresponds to a Query-Intent Classification of "Support." For example, as illustrated, the query-intent taxonomy 124 defines objective parameters that an individual search query 104 including one or more predefined text-strings will result in that individual search query 104 being included within the Query-Intent Classification of "Support."

With respect to the specifically relevant characteristics of the search query log data 112, presume that the user-base 102 has submitted one-thousand search queries 104 that relate to the specific issue of "how to add multiple people to a call in Skype." Based on the topic characteristics 122 shown and described in the illustrated scenario, the text-string of "Skype" being included within this exemplary user-generated search query 104 results in these one-thousand search queries 104 being classified within a product-related subset 126 that corresponds to a specific product of interest (e.g., Microsoft Skype). Based on the query-intent taxonomy 124 shown and described in the illustrated scenario, the text-string of "how to" being included within this exemplary user-generated search query 104 results in these one-thousand search queries 104 being further classified within the intent-specific subset 128 that corresponds to a specific user-intent (e.g., a "Support" Query-Intent Classification). It should be appreciated that not all of the one-thousand search queries 104 necessarily have the exact same formulation. Rather, variants of the specific manner in which different users formulate the search queries 104 may be included and still result in the queries being similarly classified into the same product-related and intent-specific subsets.

For illustrative purposes, presume that in the illustrated scenario the search engine 110 responds to each of the one-thousand queries 104 by returning search results 106 that include a first uniquely identified resource 210(1) which is included within the specified content source 134 and also a second uniquely identifies resource 210(2) which is external to the specified content source 134 (i.e., is from a third-party content source 136).

Upon receiving the search results 106, the user-base 102 reviews the results and selects between the first uniquely identified resource 210(1) and second uniquely identified resource 210(2) based on the user-perceived relative/comparative value therebetween. As illustrated in FIG. 3, of these one-thousand instances in which the user-base 102 enters searches that fall within the relevant subset, the user-base 102 immediately relies upon the second uniquely identified resource 210(2) seven-hundred times (i.e., 70% of the time). In stark contrast to this high reliance on the second uniquely identified resource 210(2), the user-base 102 relies upon the first uniquely identified resource 210(1) a mere one-hundred times (i.e., 20% of the time). Accordingly, based on the user-base 102 demonstrating a reliance on the second uniquely identified resource 210(2) over the first uniquely identified resource 210(1) by an amount equal to or greater than the threshold ration of one-to-one, the result of the illustrated scenario is that the content gap identification service 114 will generate a content gap report 152 to communicate various aspects of how the specified content source 134 may be wanting or lacking of certain content.

In some embodiments, determining to generate the content gap report 152 may further be based on dwell time behavior observed within the search query log data 112. For example, as further illustrated in FIG. 3, on two-hundred occasions individual users of the user-base 102 initially select the first uniquely identified resource 210(1) and then dwell on (e.g., view) the content of this first uniquely identified resource 210(1) for less than 30 seconds before turning back and selecting the second uniquely identified resource 210(2). Then, in each of these two-hundred instances the users consume the content of the second uniquely identified resource 210(2) for more than two minutes. It can be appreciated that this particular dwell time behavior may be strongly indicative of these users ascertaining that the specific content/material provided via the first uniquely identified resource 210(1) is comparatively deficient to the specific content/material provided via the second uniquely identified resource 210(2). Accordingly, this dwell time behavior may be indicative of an opportunity to enhance the first uniquely identified resource 210(1) in some particular content area.

Figure 4:
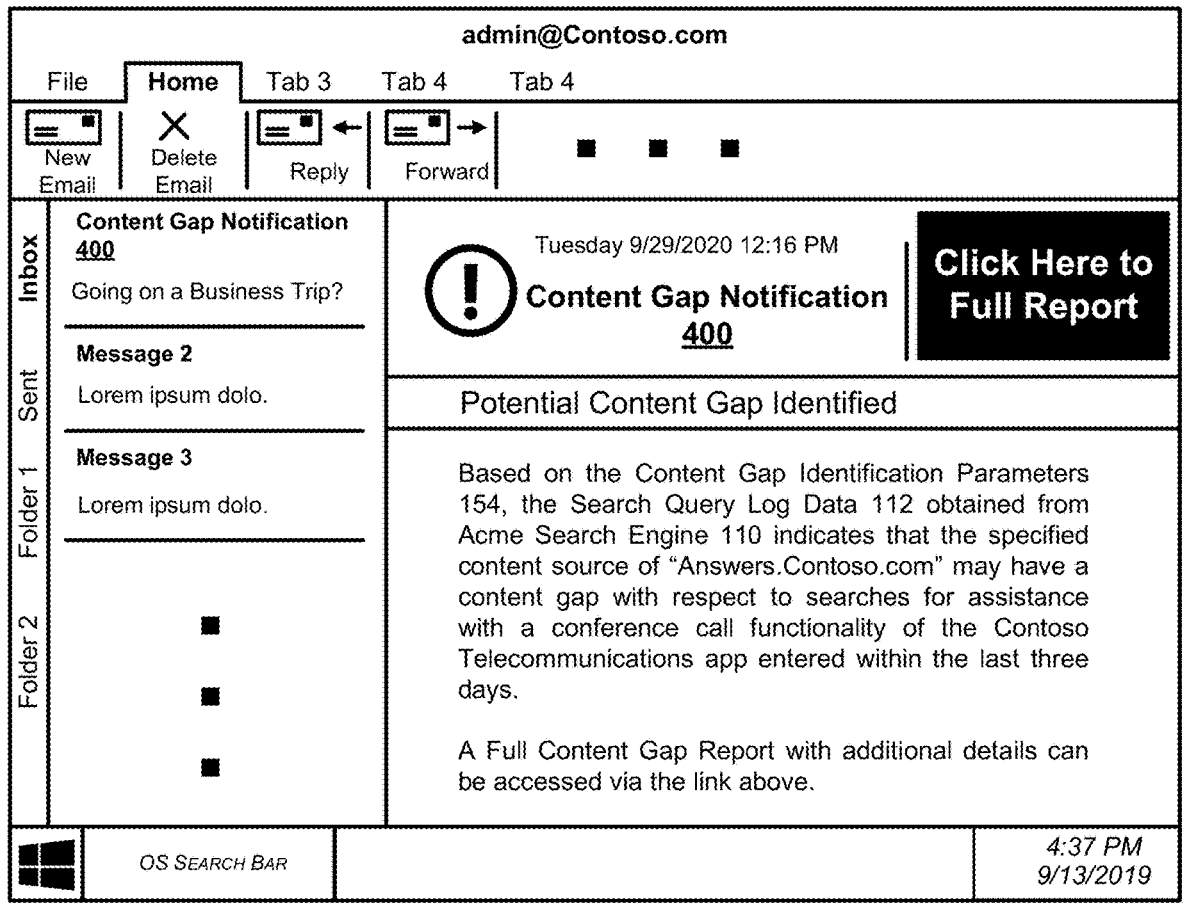
FIG. 4 illustrates an exemplary content gap notification that may be transmitted in response to identification of a content gap within a specified content source.

Turning now to FIG. 4, illustrated is an exemplary content gap notification 400 that may be transmitted in response to identification of a content gap within a specified content source as described herein. As illustrated, the content gap notification 400 may be in the form of an email message that is automatically sent by the content gap identification service 114 based on an analysis of the search query log data 112 with respect to the content gap identification parameters 154.

In some embodiments, the content gap notification 400 may indicate that a potential content gap has been identified and may further include various corresponding details. For example, as shown, the email body of the content gap notification includes an indication that an analysis of search query log data 112 associated with some relevant time period (e.g., the last three days) with respect to some content gap identification parameters 154 has revealed that the specified content source may be lacking in certain content users are searching for. As further illustrated, the content gap notification 400 may further be linked to a full Content Gap Report that includes additional details associated with the potential content gap. The full content gap report may include, but is not limited to, any of the information shown and described in relation to the dashboard GUI 200 of FIG. 2.

Figure 5A:
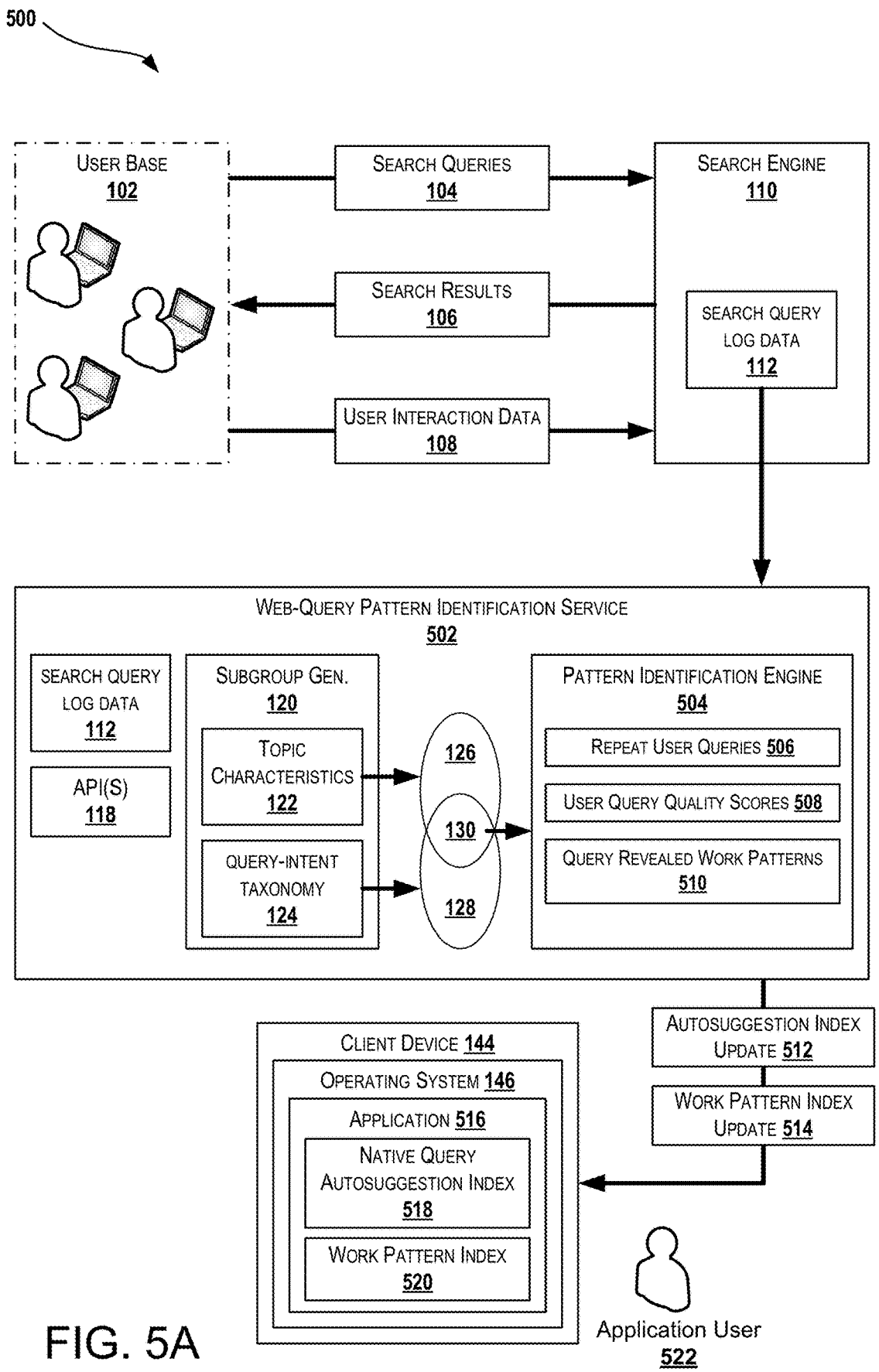
FIG. 5A illustrates an exemplary system that deploys a web-query pattern identification service to identify patterns within the search query log data that are usable to improve a native in-application user experience for an application.

Turning now to FIG. 5A, illustrated is an exemplary system 500 that deploys a web-query pattern identification service 502 to identify patterns within the search query log data 112 that are usable to improve a native in-application user experience for an application 516. More specifically, the web-query pattern identification service 502 is configured to enhance the in-app user experience, of the application 516, based on out-of-app web browsing activity that occurs to with the user-intent of learning about specific functionalities of the application 516.

In some embodiments, the web-query pattern identification service 502 analyzes the search query log data 112 to generate autosuggestion index updates 512 for updating a native query autosuggestion index 518 that is built into (e.g., native to) the application 516. It will be appreciated that the web-query pattern identification service 502 may be configured to perform some or all of that the content gap identification service 114 is shown and described as performing in relation to FIG. 1. For example, as illustrated, the web-query pattern identification service 502 is configured to deploy a subgroup generator 120 to identify a relevant subset 130 of the search queries 104. The relevant subset 130 may include queries that are determined to be included within each of a topic-related subset 126 and the intent-specific subset 128. For purposes of FIG. 5, an exemplary topic-related subset 126 may include queries that are determined to be entered in relation to a specific feature or functionality of the application 516 (e.g., a watermark feature of a word processing application). Furthermore, an exemplary intent-specific subset 128 may include queries that are entered in question form and reveal a user-intent to obtain information about the underlying topic of the query. Thus, for purposes of FIG. 5, an exemplary relevant subset 130 may include search queries 104 that are entered to the search engine 110 in question form with the underlying user-intent of obtaining information about a watermark feature of a word processing application. Upon identifying the relevant subset 130, the web-query pattern identification service 502 deploys a pattern identification engine 504 to analyze the relevant subset 130 to identify opportunities to improve upon or enhance the native query autosuggestion index 518.

In some embodiments, the pattern identification engine 504 identifies repeat user queries 506 from the relevant subset 130. For example, the pattern identification engine 504 may identify a number of common and/or trending search queries that are being searched via the search engine 110 in association a watermark functionality of the application 516. Then, based on the analysis revealing these common/trending search queries 104, the web-query pattern identification service 502 may generate an autosuggestion index update 512 to improve the native query autosuggestion index 518. Installation of the autosuggestion index update 512 to the application 516 at the client device 144 serves to enhance the in-app user experience based on out-of-app web browsing activity that occurs in association with specific functionalities of the application 516.

As a specific example, suppose that an analysis of the relevant subset 130 to generate the repeat user queries 506 reveals that the three most common search queries 104 entered in question form and in association with the watermark functionality of the application 516 include: (1) "How do I create a watermark in word", (2) "Why is watermark not showing in word", and (3) "How do I watermark a whole page in word." Further suppose that these specific queries are omitted from the native query autosuggestion index 518 (or ranked to low or otherwise inappropriately). Under these specific circumstances, the web-query pattern identification service 502 may generate an autosuggestion index update 512 that is specifically designed to adjust an existing version of the native query autosuggestion index 518 based on the foregoing three most common search queries being revealed via the analysis of the relevant subset 130. For example, installation of the autosuggestion index update 512 may result in these three common search queries being added to the native query autosuggestion index 518. Then, upon a user beginning to type and in-app query into a built-in help functionality that is native to the application 516, individual repeat user queries 506 that have been identified the analysis of the search query log data 112 obtained from search engine 110 may be visually presented to the application user 522 as suggestions of potentially relevant topics.

In some embodiments, the pattern identification engine 504 determines user query quality scores 508 in association with individual ones of the identified repeat user queries 506. The user query quality scores may be based on query reformulation data indicated a frequency with which a user reformulates individual ones of the identified repeat user queries 506. For example, a particular query that is frequently entered and then immediately reformulated once search results 106 are served to the user base 102 may be assigned a lower score as compared to another query that is frequently entered without any follow up reformulations (e.g., users tend to identify a suitable result directly from the search results returned in association with this other query). In some embodiments, generation of the autosuggestion index update 512 may be based on both of the repeat user queries 506 and the user query quality scores 508 corresponding thereto.

In some embodiments, the web-query pattern identification service 502 analyzes the search query log data 112 to generate work pattern index updates 514 for updating a work pattern index 520. For example, analysis of the search query log data 112 may uncover query revealed work patterns 510 that are commonly performed by the user base 102. For example, an analysis of the relevant subset 130 may reveal that the user base 102 frequently performs searches related to learning how to attach a file that is open within the application 516 directly to an email immediately after having performed searches related to learning how to upload the file to a cloud database. Then, based on the query revealed work patterns 510, the web query pattern identification service 502 may generate a work pattern index update 514 that can be installed on the application of 16 to update a native or built-in work pattern index 520. For example, installation of the work pattern index update 514 onto the application 516 at the client device 144 may result in a listing of suggested actions being dynamically updated to include suggested action of "attached file to email" in response to a determination that the application user 522 has just uploaded the file to a cloud database directly from the application 516.

Figure 5B:
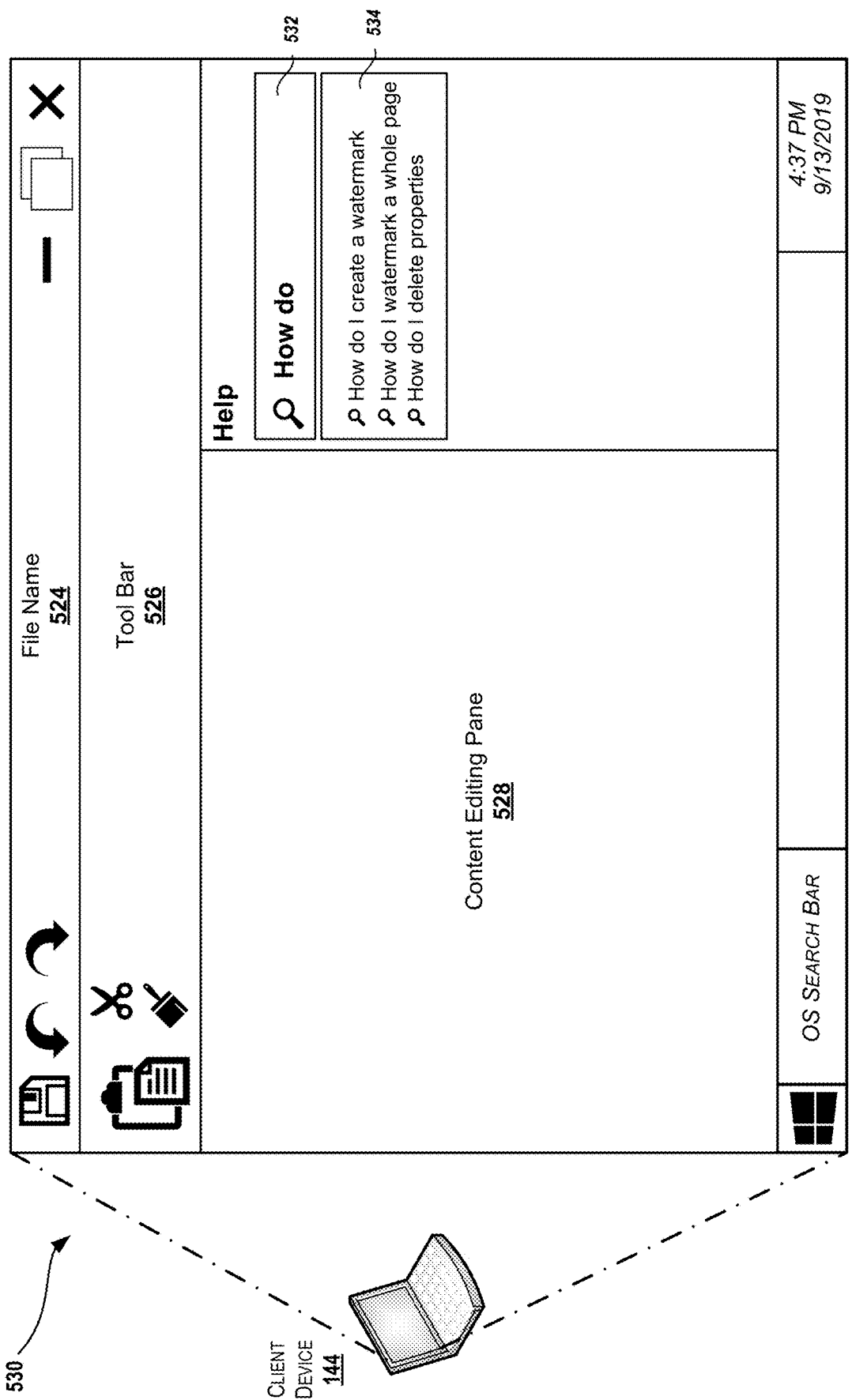
FIG. 5B is an exemplary GUI in which a plurality of query autosuggestions are being been exposed to an application user based on an autosuggestion index update as described in FIG. 5A.

Turning now to FIG. 5B, an exemplary GUI 530 is shown in which a plurality of query autosuggestions 534 have been exposed based on an autosuggestion index update 512 as described in FIG. 5A. In particular, as illustrated, subsequent to the autosuggestion index update 512 being installed on the client computing device 144, the application user 522 enters an initial portion of a search query of "How to" which in turn causes the application 516 to automatically present one or more query autosuggestions 534 that have been gleaned from analyzing the relevant subset 130.

In the illustrated embodiment, the GUI 530 is shown in the context of the application 516 being a word processing type application such as, for example, Microsoft Word. Here, the GUI 530 includes a filename 524 indicating the name of the file which is currently open to the word processing type application. Furthermore, the GUI 530 includes a toolbar 526 including various user selectable interface elements for invoking various functionalities of the word processing type application. Furthermore, the GUI 530 includes a content editing pain 528 within which the application user 522 be added content associated with the file which is currently open. However, these specific details of the exemplary GUI 530 are shown for illustrative purposes only and are not to be construed as limiting of the types of applications within which the disclosed techniques are applicable and/or suitable for use.

Figure 6:
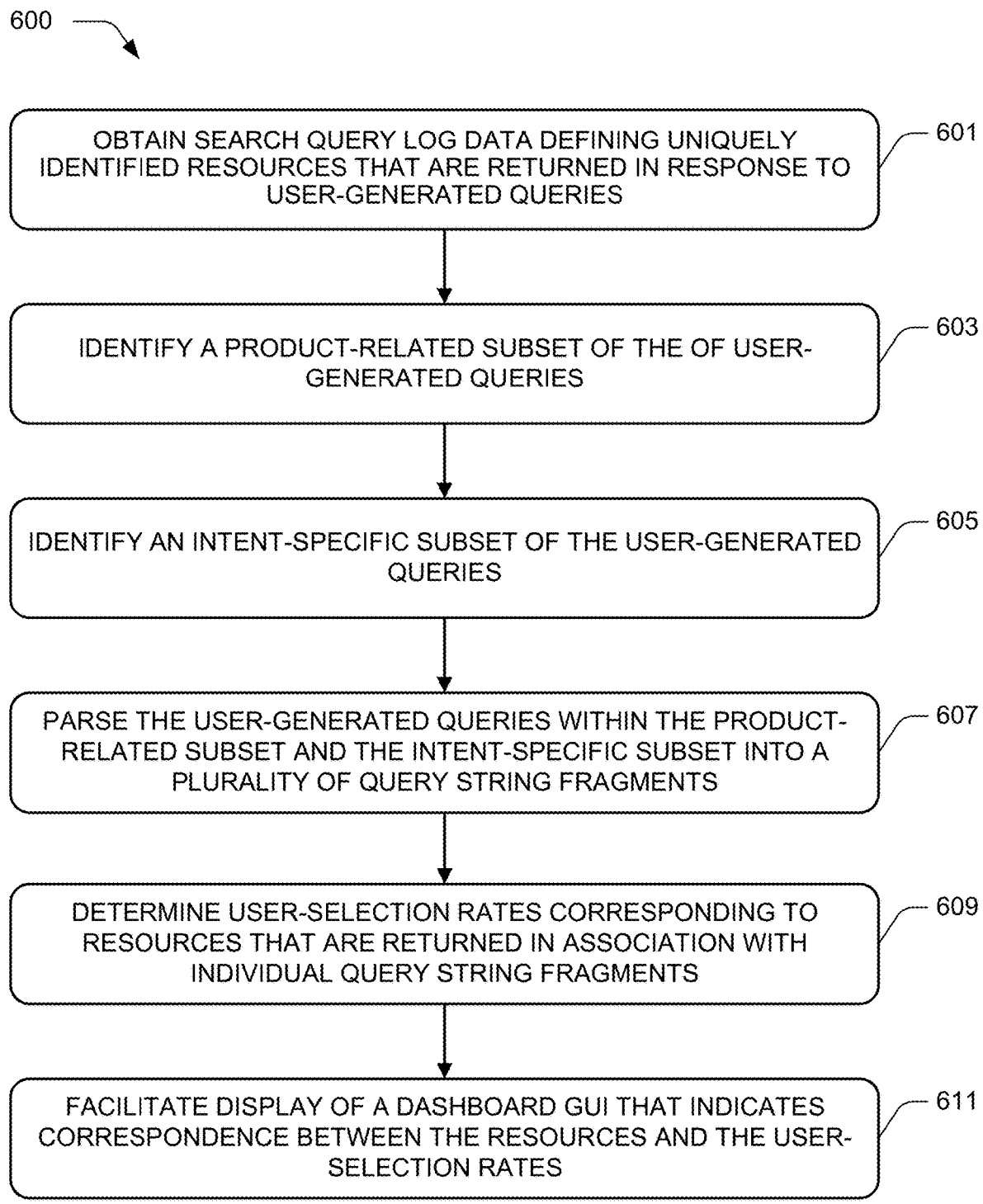
FIG. 6 is a diagram illustrating aspects of a routine for determining user-selection rates for particular query string fragments that are included within a relevant subset of user-generated search queries.

FIG. 6 is a diagram illustrating aspects of a routine 600 for determining user-selection rates for particular query string fragments that are included within a relevant subset of user-generated search queries. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

At operation 601 of the routine 600, a system (e.g., the content gap identification service 114) may obtain search query log data as described above in relation to FIG. 1. The search query log data may define uniquely identified resources that have been returned in response to user-generated search queries. As described in relation to FIG. 1, the search query log data may further include user interaction data that defines aspects of how a user-base has interacted with the returned resources. For example, the search query log data may define which particular webpages (of the search results 106) have been selected (e.g., visited) by specific individual users (e.g., as identified by corresponding client IDs).

At operation 603, the system may identify a product-related subset of the user-generated queries. That is, the system may analyze the user-generated queries on an individual basis to identify those queries which include product characteristics that are indicative of a product of interest. For example, as described in relation to FIG. 3, the system may identify queries that include certain predefined text-stings and then designate these queries for inclusion within the product-related subset.

At operation 605, the system may identify an intent-specific subset of the user-generated queries. That is, the system may analyze the user-generated queries on an individual basis to identify those queries which include product query-intent parameters that are indicative of those individual queries having been entered with some particular user-intent or underlying purpose. For example, as described in relation to FIG. 3, the system may identify queries that include certain predefined text-stings and then designate these queries for inclusion within the intent-specific subset.

At operation 607, the system may parse the queries that have been identified for the product-specific subset and the intent-specific subset (i.e., the relevant subset 130 as described above in relation to FIG. 1) into a plurality of query string fragments. For example, the system may identify any individual text-strings that are included at some predefined threshold rate within the relevant subset 130. Identification of the query-sting fragments may include identifying high-volume and/or currently trending phrases that are being submitted by a user-base to a search engine within user-generated queries 104.

At operation 609, the system determines user-selection rates corresponding to resources that are returned in association with individual ones of the query string fragments. For example, as described in relation to FIG. 2, the system may determine an ordered listing of the most selected resources that were clicked on (e.g., selected) from the search results that were returned in response to individual queries which included each individual query string fragment.

Then, at operation 611, the system may generate data that facilitates display of a dashboard graphical user interface (GUI) that graphically indicates unique correspondence between the individual uniquely identified resources and the individual user-selection rates. For example, the system may communicate data to a client device that causes the client device to render the dashboard GUI shown in FIG. 2.

Figure 7:
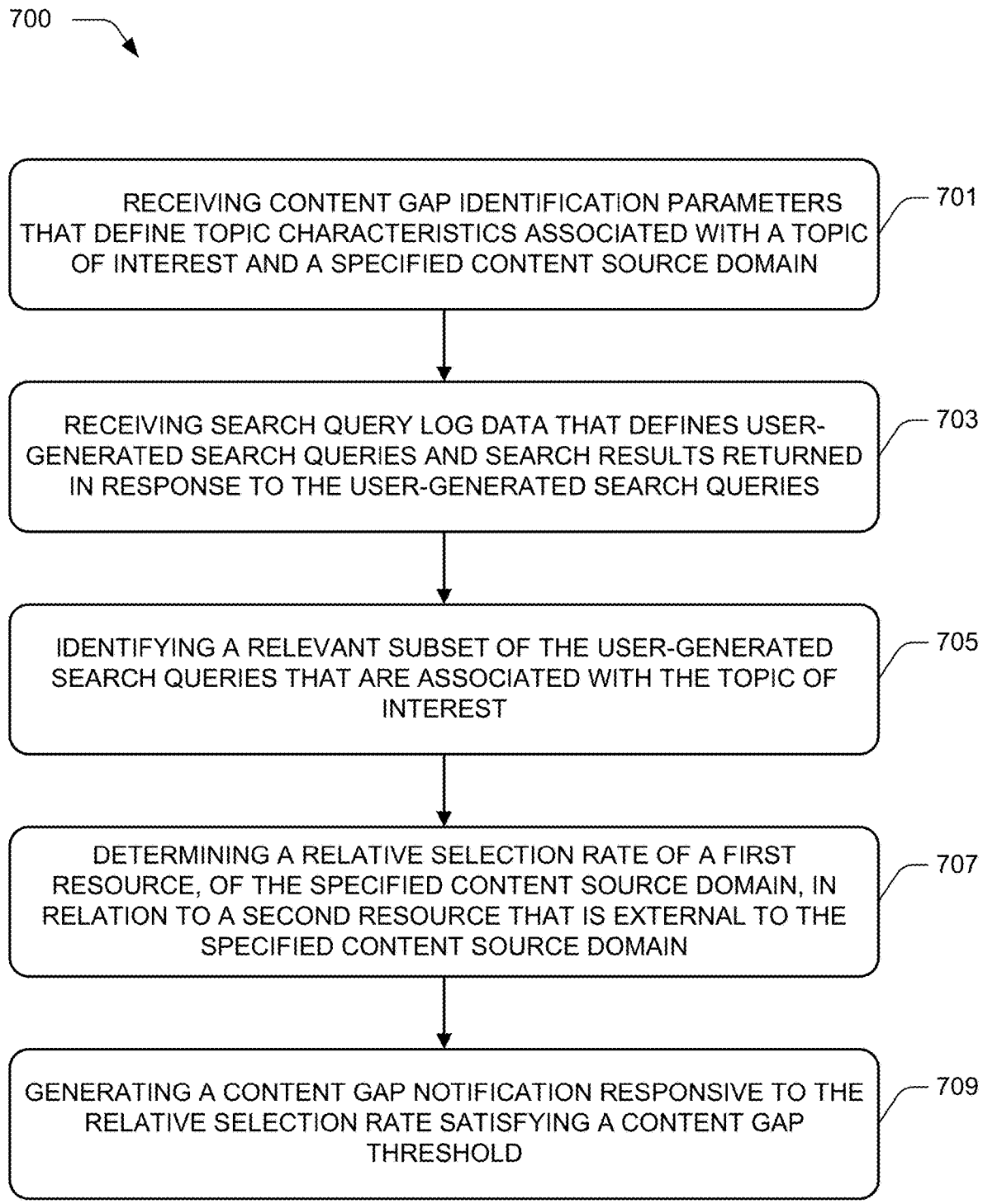
FIG. 7 is a diagram illustrating aspects of a routine for generating a content gap notification in response to a user-selection rate associated with a specified content source satisfying a content gap threshold.

FIG. 7 is a diagram illustrating aspects of a routine 700 for generating a content gap notification in response to a user-selection rate associated with a specified content source satisfying a content gap threshold.

The routine 700 starts at operation 701, where a system receives content gap identification parameters 154 as described in relation to FIG. 1. The content gap identification parameters may include various types of information that are suitable for identifying content gaps within some specified content source. For example, the content gap identification parameters may include an indication of a specified content source domain that a business strive to maintain high quality support content within in relation to some product offered by the business. In some implementations, the specified content source domain may be linked to a support functionality that is native or build into the product. For example, the product may be a software application that includes a built-in help search function that a user can utilize to search for topics or support content association with the features of the software application.

The content gap identification parameters may further include topic characteristics 122 that are usable to analyze search query log data to specifically identify search queries that have been entered in association with some topic if interest (e.g., the software application). Additionally, or alternatively, the content gap identification parameters may include an indication of a particular query-intent for which content gaps are being sought. For example, continuing with the example of the specified content source domain including help content that is linked to the built-in help search function of the software application, the content gap identification parameters may indicate to identify those user queries that are both related to the product of interest and which also relate to individual users searching for help or support content.

The routine 700 proceeds to operation 703, where the system receives the search query log data 112. The search query log data may include user-generated search queries, search results that were returned in response to the user-generated search queries, and user interaction data that defines how individual users of a user base interacted with the returned search results.

The routine 700 proceeds to operation 705, where the system identifies a relevant subset of the user-generated queries that are associated with the topic of interest defined in the content gap identification parameters. For example, the system may identify queries that include predefined terms associated with the topic of interest (e.g., a tradename of a software application).

The routine 700 proceeds to operation 707, where the system determines a relative selection rate of a first resource, that is returned within the search results and is included within the specified content source domain, in relation to a second resource that is external to the specified content source domain.

Then, at operation 709, the system generates a content gap notification in response to the relative selection rate satisfying some content gap threshold. As a specific but nonlimiting example, the content gap notification may be generated in response to relative selection rate of the first resource being below a ratio of one-to-one in relation to the second resource.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 8:
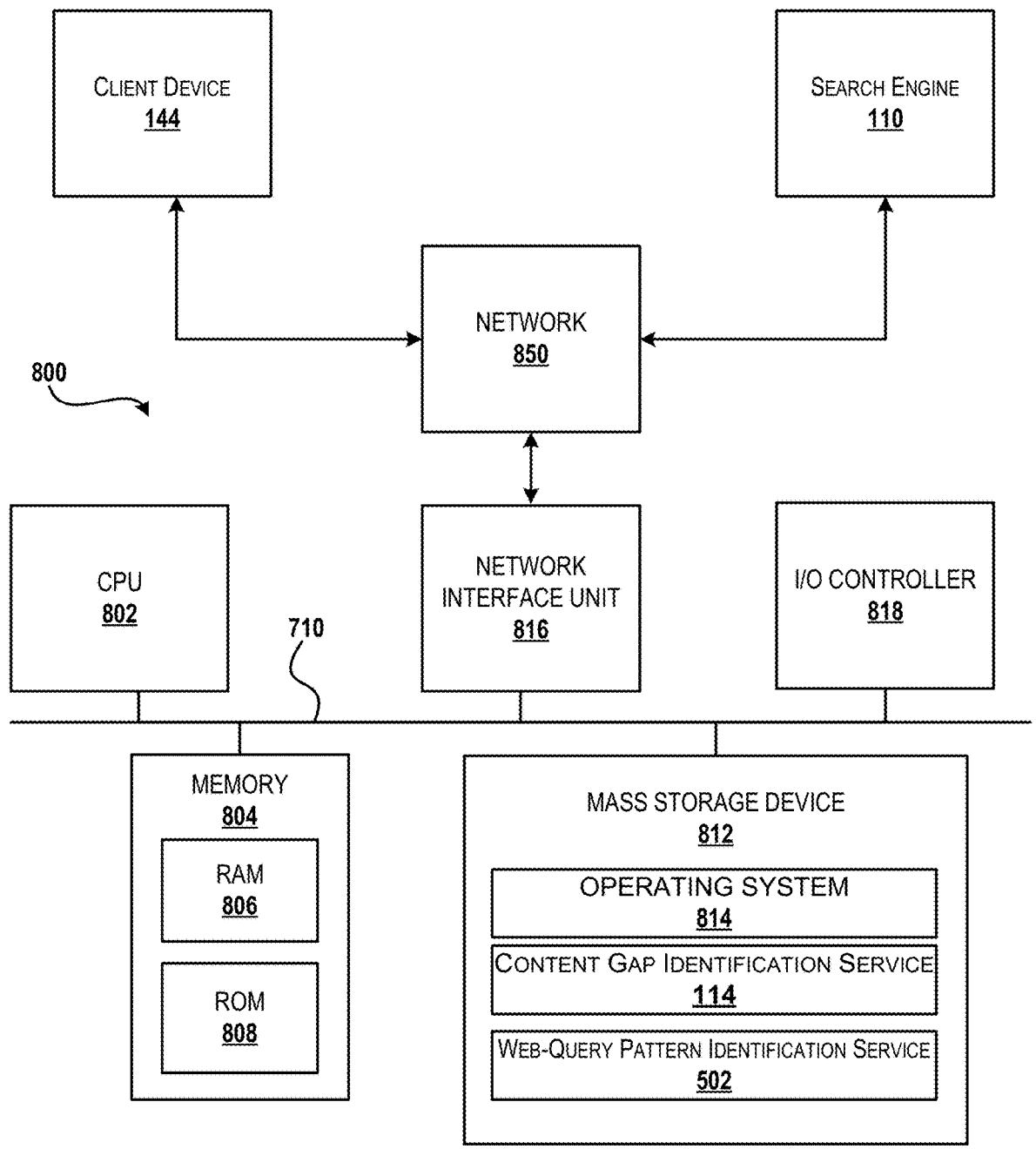
FIG. 8 shows additional details of an example computer architecture for a computer capable of executing the content gap identification and/or any program components thereof as described herein.

FIG. 8 shows additional details of an example computer architecture 800 for a computer capable of executing the content gap identification 114 and/or any program components thereof as described herein. Thus, the computer architecture 800 illustrated in FIG. 8 illustrates an architecture for a server computer, or network of server computers, or any other types of computing devices suitable for implementing the functionality described herein. The computer architecture 800 may be utilized to execute any aspects of the software components presented herein.

The computer architecture 800 illustrated in FIG. 8 includes a central processing unit 802 ("CPU"), a system memory 804, including a random-access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 814, other data, and one or more application programs. The mass storage device 812 may further include computer executable instructions that, when executed by the CPU 802, enable the computing architecture 800 to implement functionalities of the content gap identification 114.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes of the claims, the phrase "computer storage medium," "computer-readable storage medium" and variations thereof, does not include waves, signals, and/or other transitory and/or intangible communication media, per se.

According to various techniques, the computer architecture 800 may operate in a networked environment using logical connections to remote computers through a network 650 and/or another network (not shown). The computer architecture 800 may connect to the network 650 through a network interface unit 816 connected to the bus 810. It should be appreciated that the network interface unit 816 also may be utilized to connect to other types of networks and remote computer systems. The computer architecture 800 also may include an input/output controller 818 for receiving and processing input from a number of other devices, including a keyboard, mouse, or electronic stylus (not shown in FIG. 8). Similarly, the input/output controller 818 may provide output to a display screen, a printer, or other type of output device (also not shown in FIG. 8). It should also be appreciated that via a connection to the network 650 through a network interface unit 816, the computing architecture may enable the content gap identification service 114 to communicate with the client device 144 and/or the search engine 110.

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for exposing domain specific content gaps, the method comprising:
receiving, from an application offered by a first business, content gap identification parameters that define at least:
a feature of the application, and
a specified content source domain configured to provide information about the feature of the application, wherein:
the specified content source domain defines a group of resources, including a first resource, offered by the first business; and
the application offered by the first business includes a built-in help search functionality that is configured to search for help content that is accessible via the first resource included in the group of resources defined by the specified content source domain;
receiving search query log data that defines (i) user-generated search queries submitted to a search engine and (ii) search results returned by the search engine in response to the user-generated search queries;
identifying, based on the search query log data, a relevant subset of the user-generated search queries that request the information about the feature of the application;
determining, for the relevant subset of the user-generated search queries, a relative user selection rate of the first resource returned by the search engine via the search results in relation to a second resource returned by the search engine via the search results, wherein:
the second resource is external to the specified content source domain;
the second resource is offered by a second business;
the second business is different from the first business; and
the second resource is also configured to provide information about the feature of the application; and
responsive to the relative user selection rate satisfying a content gap threshold, generating a content gap notification indicating that the first resource, that is included in the group of resources defined by the specified content source domain, has a content gap in relation to the second resource that is external to the specified content source domain, the content gap associated with a difference in an amount of the information provided about the feature of the application.

2. The computer-implemented method of claim 1, further comprising:
determining occurrence levels corresponding to individual query string fragments of the user-generated search queries submitted to the search engine; and
causing a dashboard graphical user interface (GUI) to graphically indicate the occurrence levels in association with the content gap notification.

3. The computer-implemented method of claim 1, wherein identifying the relevant subset of the user-generated search queries, submitted to the search engine, comprises identifying at least one of:
a product-related subset of the user-generated search queries, or
an intent-specific subset of the user-generated search queries.

4. The computer-implemented method of claim 1, wherein the content gap threshold corresponds to a threshold ratio between a first user selection rate associated with the first resource returned by the search engine via the search results and a second user selection rate associated with the second resource returned by the search engine via the search results.

5. The computer-implemented method of claim 1, wherein the relevant subset of the user-generated search queries is limited to an effective date range.

6. A computer-readable storage medium storing instructions which, when executed by a processor, cause the processor to perform operations comprising:
receiving, from an application offered by a first business, content gap identification parameters that define at least:
a feature of the application, and
a specified content source domain configured to provide information about the feature of the application, wherein:
the specified content source domain defines a group of resources, including a first resource, offered by the first business; and
the application offered by the first business includes a built-in help search functionality that is configured to search for help content that is accessible via the first resource included in the group of resources defined by the specified content source domain;

receiving search query log data that defines (i) user-generated search queries submitted to a search engine and (ii) search results returned by the search engine in response to the user-generated search queries;

identifying, based on the search query log data, a relevant subset of the user-generated search queries that request the information about the feature of the application;

determining, for the relevant subset of the user-generated search queries, a relative user selection rate of the first resource returned by the search engine via the search results in relation to a second resource returned by the search engine via the search results, wherein:
the second resource is external to the specified content source domain;
the second resource is offered by a second business;
the second business is different from the first business; and
the second resource is also configured to provide information about the feature of the application; and responsive to the relative user selection rate satisfying a content gap threshold, generating a content gap notification indicating that the first resource, that is included in the group of resources defined by the specified content source domain, has a content gap in relation to the second resource that is external to the specified content source domain, the content gap associated with a difference in an amount of the information provided about the feature of the application.

7. The computer-readable storage medium of claim 6, wherein the operations further comprise:
determining occurrence levels corresponding to individual query string fragments of the user-generated search queries submitted to the search engine; and
causing a dashboard graphical user interface (GUI) to graphically indicate the occurrence levels in association with the content gap notification.

8. The computer-readable storage medium of claim 6, wherein identifying the relevant subset of the user-generated search queries, submitted to the search engine, comprises identifying at least one of:
a product-related subset of the user-generated search queries, or
an intent-specific subset of the user-generated search queries.

9. The computer-readable storage medium of claim 6, wherein the content gap threshold corresponds to a threshold ratio between a first user selection rate associated with the first resource returned by the search engine via the search results and a second user selection rate associated with the second resource returned by the search engine via the search results.

10. The computer-readable storage medium of claim 6, wherein the relevant subset of the user-generated search queries is limited to an effective date range.

11. A system, comprising:
at least one processor; and
memory in communication with the at least one processor, the memory having computer-readable instructions stored thereupon that, when executed by the at least one processor, cause the system to perform operations comprising:
receiving, from an application offered by a first business, content gap identification parameters that define at least:
a feature of the application, and
a specified content source domain configured to provide information about the feature of the application, wherein:
the specified content source domain defines a group of resources, including a first resource, offered by the first business; and
the application offered by the first business includes a built-in help search functionality that is configured to search for help content that is accessible via the first resource included in the group of resources defined by the specified content source domain;

receiving search query log data that defines (i) user-generated search queries submitted to a search engine and (ii) search results returned by the search engine in response to the user-generated search queries;

identifying, based on the search query log data, a relevant subset of the user-generated search queries that request the information about the feature of the application;

determining, for the relevant subset of the user-generated search queries, a relative user selection rate of the first resource returned by the search engine via the search results in relation to a second resource returned by the search engine via the search results, wherein:
the second resource is external to the specified content source domain;
the second resource is offered by a second business;
the second business is different from the first business; and
the second resource is also configured to provide information about the feature of the application; and responsive to the relative user selection rate satisfying a content gap threshold, generating a content gap notification indicating that the first resource, that is included in the group of resources defined by the specified content source domain, has a content gap in relation to the second resource that is external to the specified content source domain, the content gap associated with a difference in an amount of the information provided about the feature of the application.

12. The system of claim 11, wherein the operations further comprise:
determining occurrence levels corresponding to individual query string fragments of the user-generated search queries submitted to the search engine; and
causing a dashboard graphical user interface (GUI) to graphically indicate the occurrence levels in association with the content gap notification.

13. The system of claim 11, wherein identifying the relevant subset of the user-generated search queries, submitted to the search engine, comprises identifying at least one of:
a product-related subset of the user-generated search queries, or
an intent-specific subset of the user-generated search queries.

14. The system of claim 11, wherein the content gap threshold corresponds to a threshold ratio between a first user selection rate associated with the first resource returned by the search engine via the search results and a second user selection rate associated with the second resource returned by the search engine via the search results.

15. The system of claim 11, wherein the relevant subset of the user-generated search queries is limited to an effective date range.

* * * * *